US007254631B2

United States Patent
Crudele et al.

(10) Patent No.: US 7,254,631 B2
(45) Date of Patent: Aug. 7, 2007

(54) METHOD AND SYSTEM FOR DISTRIBUTING SOFTWARE FEATURES TO A COMPUTER

(75) Inventors: Michele Crudele, Isernia (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 10/042,100

(22) Filed: Jan. 8, 2002

(65) Prior Publication Data

US 2002/0156889 A1 Oct. 24, 2002

(30) Foreign Application Priority Data

Apr. 19, 2001 (GB) ............................. 0109620.5

(51) Int. Cl.
G06F 15/00 (2006.01)
G06F 11/30 (2006.01)
G06F 12/14 (2006.01)
(52) U.S. Cl. ................. 709/224; 713/201; 713/191; 717/170; 717/120; 345/745; 345/762; 345/763; 345/852; 345/853
(58) Field of Classification Search ........ 709/223–226, 709/203, 208, 229, 246, 316, 328; 707/3; 710/20, 36, 22; 712/31; 370/230, 235; 379/27.01; 713/2; 717/178, 120, 170; 345/745, 762
See application file for complete search history.

(56) References Cited

U.S. PATENT DOCUMENTS 5,781,711 A * 7/1998 Austin et al. ............... 358/1.15
5,933,647 A * 8/1999 Aronberg et al. ........... 717/178

(Continued)

FOREIGN PATENT DOCUMENTS

JP 10-177534 6/1998

(Continued)

OTHER PUBLICATIONS

WO 00/29983☐☐PCT/SE99/02058☐☐international filing date: U.S. Appl. No. 09/189,851, filed Nov. 12, 1998.*

(Continued)

*Primary Examiner*—David Wiley
*Assistant Examiner*—Jude J. Jean-Gilles
(74) *Attorney, Agent, or Firm*—Stephen J. Walder, Jr.; Jeffrey S. LaBaw (57) ABSTRACT

A method (300) of distributing software features (particularly software products having a global portion and a user portion necessary for activating the software products) to client workstations of a network; each client workstation has a multi-user operating system, and may be accessed (327-328) with different user profiles each one associated with a corresponding operating context. A distribution package is received (312) in the client workstation; the distribution package includes instructions associated with global activities for the client workstation as a whole or with user activities specific for the single profiles. A distribution agent (running outside the context of a current profile) executes (309-329) only the global activity (even if the workstation is in a logoff condition) and schedules the user activities to be performed when a user next logs onto the workstation. A user agent loaded (330) when the workstation is accessed with a selected profile executes (333-339) the user activities in the corresponding context.

20 Claims, 4 Drawing Sheets

U.S. PATENT DOCUMENTS

| | | | |
|---|---|---|---|
| 6,167,567 A | 12/2000 | Chiles et al. | |
| 6,424,968 B1 * | 7/2002 | Broster et al. | 707/3 |
| 6,510,466 B1 * | 1/2003 | Cox et al. | 709/229 |
| 6,519,571 B1 * | 2/2003 | Guheen et al. | 705/14 |
| 6,578,142 B1 * | 6/2003 | Anderson et al. | 713/2 |
| 6,615,253 B1 * | 9/2003 | Bowman-Amuah | 709/219 |
| 6,684,259 B1 * | 1/2004 | Discavage et al. | 719/316 |
| 6,771,290 B1 * | 8/2004 | Hoyle | 715/745 |
| 6,826,534 B1 * | 11/2004 | Gupta et al. | 705/1 |
| 6,839,680 B1 * | 1/2005 | Liu et al. | 705/10 |

FOREIGN PATENT DOCUMENTS

WO     WO 98/40807 A2     2/1998

OTHER PUBLICATIONS

Junnichi Annnou et al., "The Art of Windows NT Administration", Ohmsha, Japan, Jan. 25, 2000, pp. 36-42, 229-237.

Cassel, Paul, "Microsoft Windows 2000 Professional Unleashed (Japanese translated version)", ASCII Corporation, pp. 503-506.

* cited by examiner

METHOD AND SYSTEM FOR DISTRIBUTING SOFTWARE FEATURES TO A COMPUTER

FIELD OF INVENTION

The present invention relates to a method and system for distributing software features to a computer.

BACKGROUND OF THE INVENTION

Distribution of software features (such as new software products or new versions thereof) is a common activity in a data processing system. A typical case is that of a network with a great number of workstations, wherein a software configuration of each workstation is periodically updated; for example, the software products installed on the workstation are upgraded, or the software configuration of the workstation is modified to comply with a profile or organisational change.

Different software distribution applications have been proposed in the last years to assist a system administrator in efficiently managing deployment of the new software configurations to (client) workstations of the network. A software distribution application runs on a server workstation of the network and controls building of packages including the software products to be installed and instructions understandable by the client workstations. Each package is distributed to the respective client workstation through the network; the instructions embedded in the package cause the software products to be automatically installed or removed in order to reach the desired software configuration of the client workstation.

Several types of operating systems running on the client workstations allow different user profiles to be defined. As a consequence, a user can log onto the workstation with a selected profile, and then work in a corresponding desired context. The context defines an operating environment specific for the user, for example with different software products available, operations to be executed automatically, shortcuts on a desktop, personal configuration parameters, authorisation for using system resources or for executing certain operations, and the like.

The solutions known in the art do not manage the above-described scenario in a satisfactory manner. Particularly, no support is provided to the administrator for setting specific software configurations for the various users of the workstations. In fact, an agent of the software distribution application usually runs in a context of a privileged profile, in order to have all the authorisations needed to install or remove the software products. However, the configuration information for a specific context cannot be modified from a different context for security reasons, not even if the different context is associated with the privileged profile. Therefore, the software distribution application is unable to define software configurations customised for the different users.

It is an object of the present invention to overcome the above-mentioned drawbacks. In order to achieve this object, a method as set out in the first claim is proposed.

DISCLOSURE OF THE INVENTION

Briefly, the present invention provides a method of distributing software features to a computer being accessible with a plurality of different user profiles each one associated with a corresponding operating context, the method including the steps of providing a distribution package including at least one item indicative of an activity for enforcing a corresponding software feature on the computer, at least one activity being defined as a user activity associated with at least one user profile, storing an indication of the at least one user activity on the computer, accessing the computer with a current user profile, and retrieving and executing each user activity associated with the current user profile in the corresponding operating context.

Moreover, the present invention also provides a computer program for performing the method, a product storing the program, and a corresponding system for distributing software features.

BRIEF DESCRIPTION OF THE DRAWINGS

Further characteristics and the advantages of the solution according to the present invention will be made clear by the following description of a preferred embodiment thereof, given purely by way of a non-restrictive indication, with reference to the attached figures, wherein.

DESCRIPTION OF THE PREFERRED EMBODIMENTS

Figure 1:
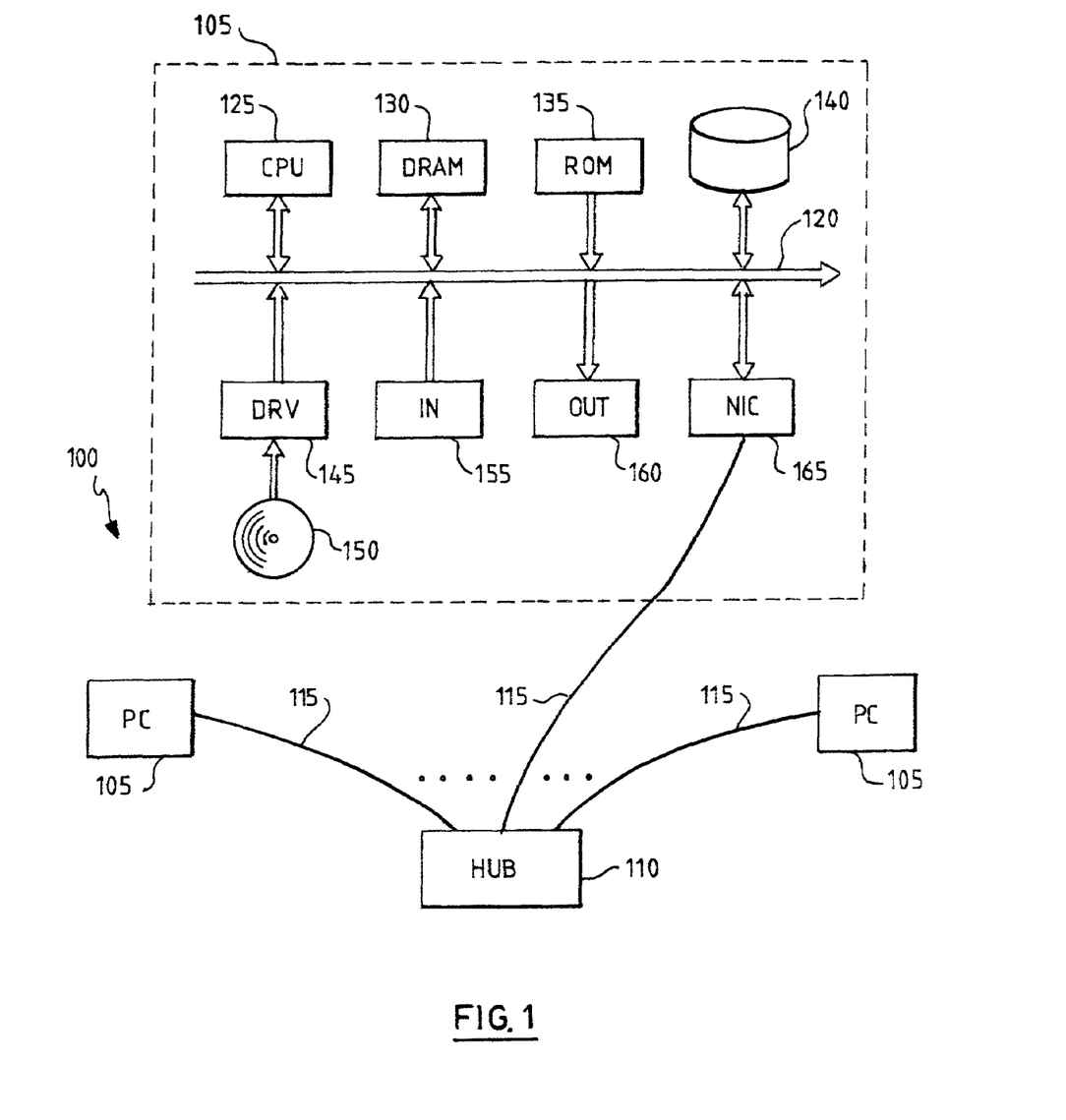
FIG. 1 is a basic block diagram of a networking system in which the method of the invention can be used.

With reference in particular to FIG. 1, there is shown a networking system 100, for example a LAN (Local Area Network). The LAN 100 if formed by a plurality of workstations 105, typically consisting of PCs (Personal Computers). The workstations 105 are connected to one or more concentrators 110 (such as hubs) through respective communication cables 115. The networking system 100 has a client/server architecture, wherein one or more of the workstations 105 (generally consisting of powerful computers) manage network resources, such as shared files and devices; the other workstations 105 operate as clients on which users run applications relying on server resources.

Each workstation 105 includes several units, which are connected in parallel to a communication bus 120. In particular, a central processing unit (CPU) 125 controls operation of the workstation 105, a working memory 130 (typically a DRAM) is used directly by the CPU 125, and a read-only memory (ROM) 135 stores a basic program for starting the workstation 105. Various peripheral units are further connected to the bus 120 (by means of respective interfaces). Particularly, a bulk memory consists of a hard-disk 140 and of a driver unit (DRV) 145 for reading CD-ROMs 150; the workstation 105 further includes an input unit (IN) 155, which consists for example of a keyboard and a mouse, and an output unit (OUT) 160, which consists for example of a monitor. A network interface card (NIC) 165 is used to connect the workstation 105 to the concentrator 110 (through the communication cable 115).

Similar considerations apply if the networking system has a different topology, if the networking system includes different components (such as one or more switches), if the networking system consists of a WAN (Wide Area Network), if each workstation has a different structure (for example with a multi-processor architecture), and the like.

Figure 2:
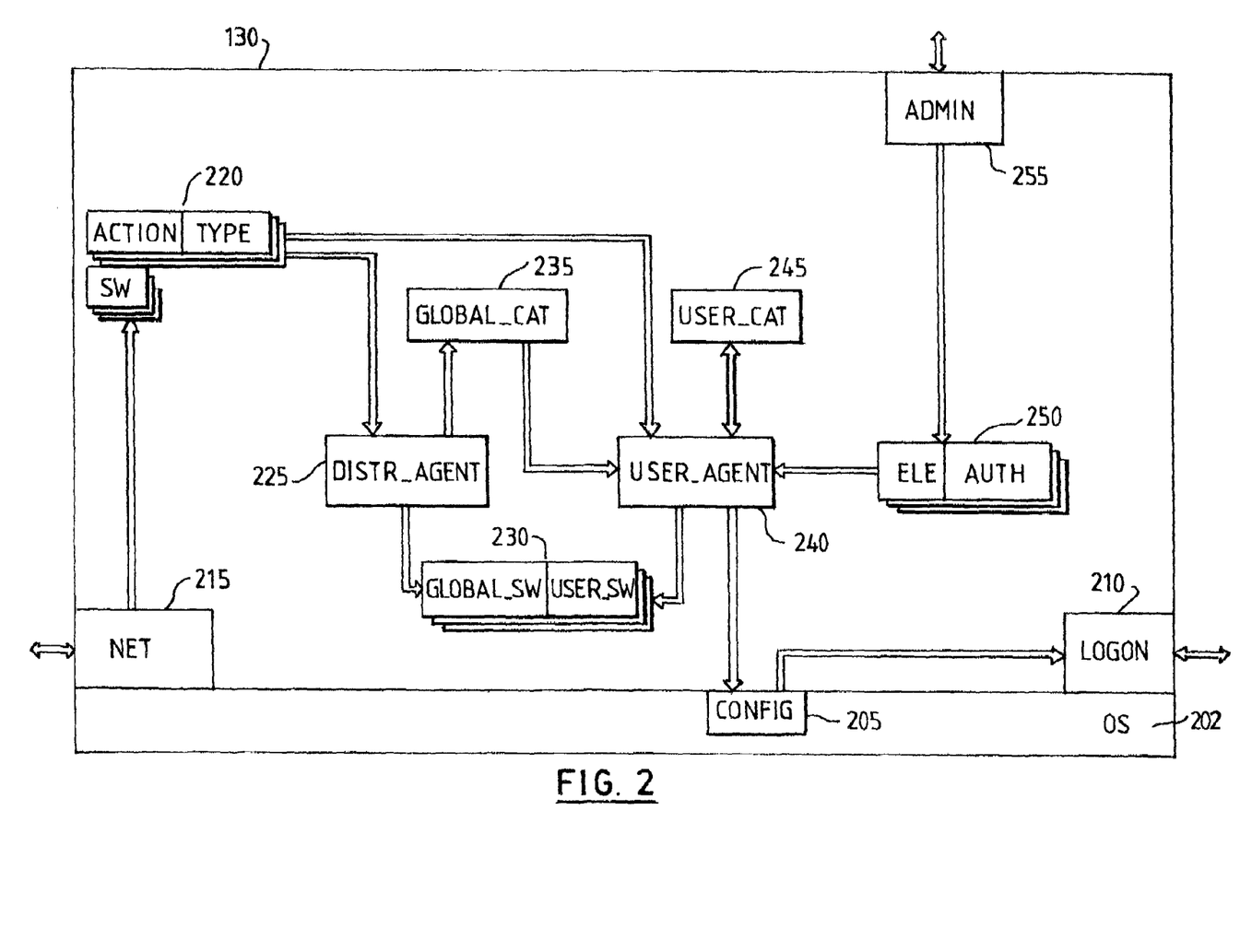
FIG. 2 shows a partial content of a working memory of a client workstation included in the networking system.

Considering now FIG. 2, there is shown a partial content of the working memory 130 of a client workstation to which software features are distributed from another workstation operating as a software distribution server; the information (programs and data) is typically stored on the hard-disk and loaded (at least partially) into the working memory 130 when the programs are running, together with other application programs (not shown in the figure). The programs are initially installed onto the hard disk of the client workstation from CD-ROM.

The working memory 130 includes an operating system (OS) 202 that provides basic services defining a software platform for the client workstation, on top of which other programs can run. The operating system 202 supports a multi-user environment. More specifically, the client workstation is accessed with a plurality of different profiles, each one assigned to a specific user or group of users; a single current profile may be enabled at a time. A data structure (CONFIG) 205 inside a kernel of the operating system 202 stores respective configuration information for each profile.

A logon module 210 controls an access to the client workstation by each user. The logon module 210 authenticates the user, requiring a username and a password to be entered. Once the user has been recognised, a session is started with the respective profile that causes the client workstation to work in a corresponding operating context; the context defines an execution environment specific for the user connected to the client workstation (including for example different software products available, operations to be executed automatically, shortcuts on a desktop, personal configuration parameters, authorisation for using system resources or for executing certain operations, and the like).

A network interface (NET) 215 is used for exchanging information with the server workstation through the network. Particularly, the network interface 215 receives and stores software distribution packages 220. Each package 220 consists of a list of items for enforcing corresponding software features on the client workstation. Each item has a field ACTION, which defines an activity consisting of one or more instructions to be carried out for reaching a desired software configuration; for example, the field ACTION specifies that a software product (such as an application program) must be installed, that another software product must be removed, that the software products must be installed or remove in an undoable manner, that a configuration parameter must be updated, that an icon must be created, updated or removed from the desktop, and the like. The field ACTION is associated with a flag TYPE, which defines the corresponding activity as a global activity for the client workstation as a whole or as a (generic) user activity for each single profile. The package 220 further includes one or more files (SW) containing the software products to be installed on the client workstation.

The packages 220 are accessed by a software distribution agent (DISTR—AGENT) 225. The distribution agent 225 runs in a (global) environment outside any context associated with a user profile; more specifically, it consists of a program that runs continuously in the background, until it is activated by the receipt of a package from the server workstation. The distribution agent 225 controls a repository 230 of software products available on the client workstation. Particularly, the distribution agent 225 installs or removes a global portion (GLOBAL_SW) of each software product; the global portion includes code that must be present on the client workstation regardless of the user employing the software product. The distribution agent 225 further controls a global catalogue (GLOBAL_CAT) 235 storing information about a status of each software feature on the client workstation as a whole; for example, the global catalogue 235 specifies that the global portion of each software product has been installed and committed, put in a back-up condition, installed in an undoable manner, removed and committed, removed in an undoable manner, and so on.

The working memory 130 further includes a user agent (USER_AGENT) 240; the user agent 240 consists of a program performing specific services in the context of a corresponding profile. The user agent 240 controls (i.e., installs or removes) a user portion (USER_SW) of each software product in the repository 230, which user portion is necessary for activating the software product in the corresponding context. The user agent 240 further accesses the configuration information 205 and the packages 220. Moreover, the user agent 240 controls a specific user catalogue (USER_CAT) 245 for each profile; the user catalogue 245 stores information on the status of each software feature in the context associated with the respective profile (for example the condition of the user portion of each software product in the context). The user agent 240 also accesses an authorisation list 250. The authorisation list 250 includes a series of records each one consisting of a field ELE identifying a software feature and a field AUTH identifying one or more profiles allowed to have this software feature enforced. The authorisation list 250 is controlled by an administrator module (ADMIN) 255, which runs in a context associated with a privileged profile (typically assigned to a system administrator).

Similar considerations apply if the programs and data are structured in a different manner, if other modules or functions are provided, if the operating system supports multiple profiles running simultaneously in time sharing, if different software features and corresponding actions are envisaged, if the software features may be in different conditions, and the like.

Figure 3A:
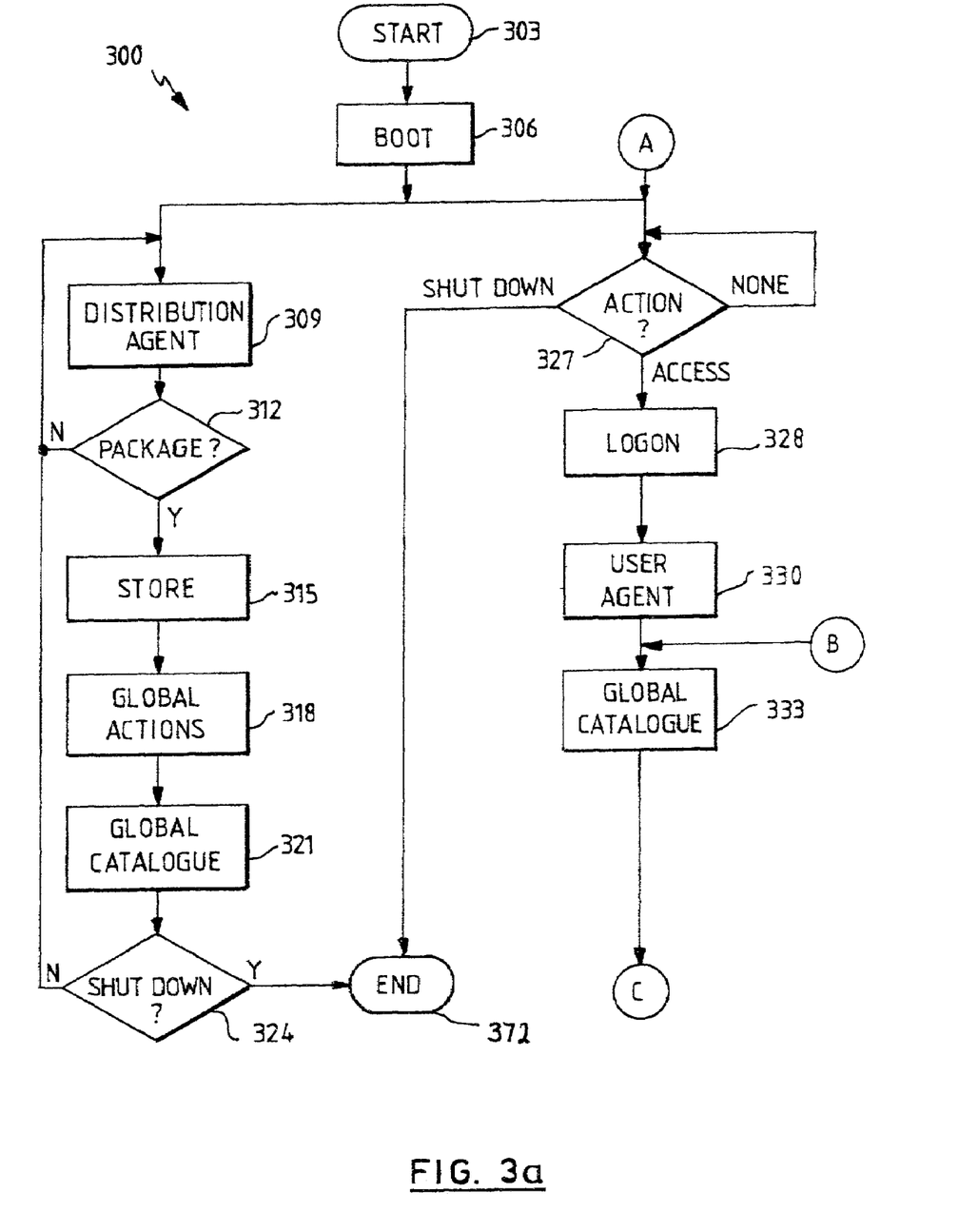
FIG. 3a-3b are a flow chart of a method for managing distribution of software features to the client workstation.
Figure 3B:
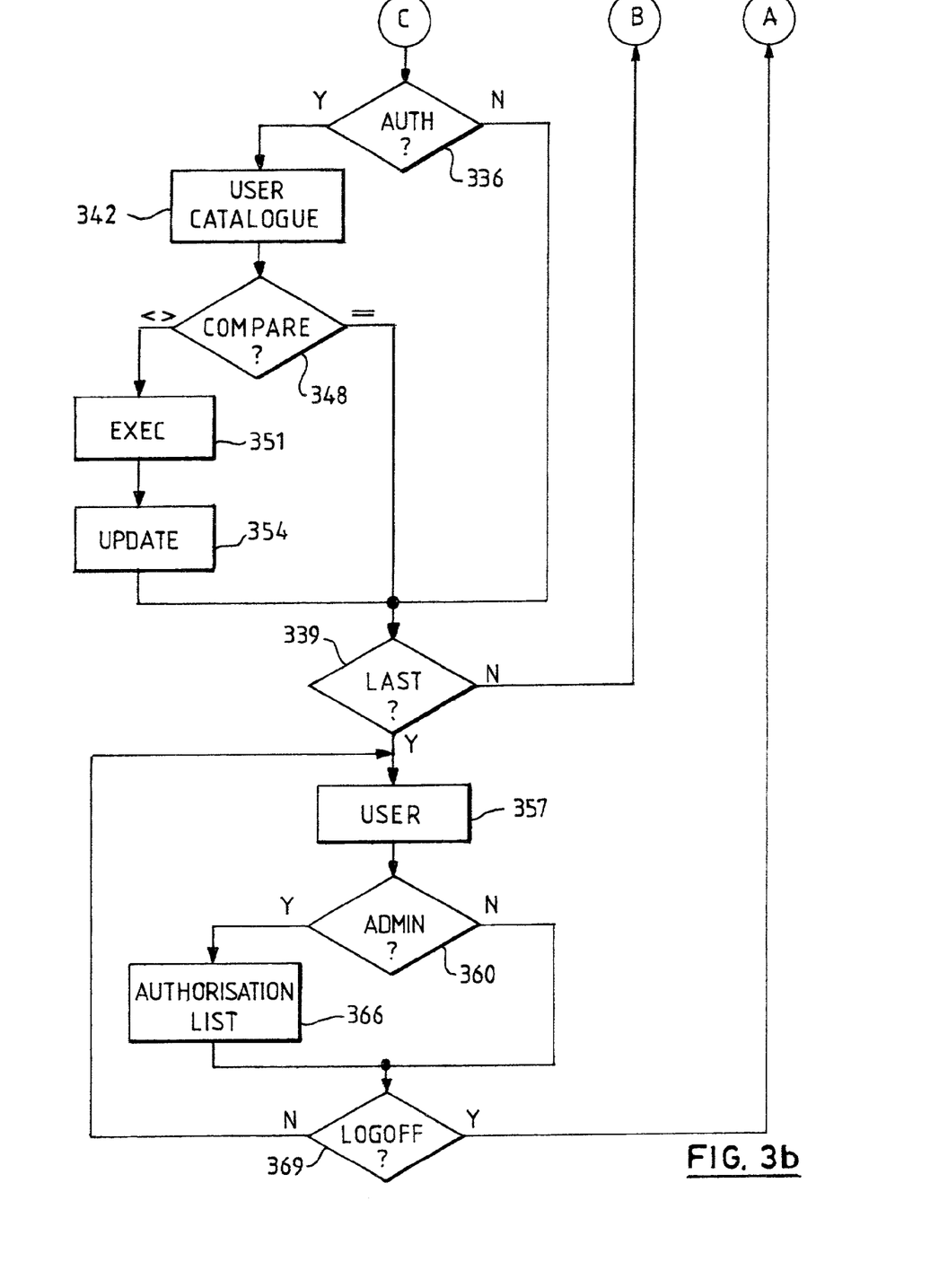

As shown in FIG. 3a-3b, each time the client workstation is switched on (either locally or remotely under the control of the server workstation), a method 300 is performed. The method 300 begins at block 303 and then passes to block 306, wherein a bootstrap process is started. The bootstrap involves loading utilities providing essential services for the client workstation, which in turn control loading and execution of the rest of the operating system. Once the bootstrap has been completed, the method forks into two braches that are executed in parallel. A first branch consists of blocks 309-324, and a second branch consists of blocks 327-369; the two branches joint at the final block 372.

Considering now block 309, the distribution agent is loaded. The distribution agent verifies at block 312 whether a new package has been received from the server workstation. If not, the method returns to block 309 in an idle loop. Conversely, the package is stored onto the working memory of the client workstation at block 315. Considering now block 318, the distribution agent executes all the instructions in the respective field ACTION of the items defined as global activities by the corresponding flag TYPE. In this way, only the global activities are executed at a distribution time; on the other hand, the user activities are scheduled to be executed only when a user logs onto the workstation with the corresponding profile (as described in detail in the following). The status information for the software features involved is accordingly updated in the global catalogue at block 321. The distribution agent then checks at block 324 whether the client workstation has been shut down. If not, the method returns to block 309 (for repeating the steps described above); on the contrary, the method ends at the final block 372.

At the same time, the method loops at block 327 waiting for a user command. If the client workstation has been shut down, the method ends at the final block 372. If a user has requested an access to the client workstation, the method passes to block 328, wherein a logon process is started. Particularly, the user is prompted to enter its username and password, once the user has been authenticated, the configuration information for the context associated with the selected profile is retrieved in order to set up the desired execution environment as the logon progresses.

Descending into block 330, the user agent is loaded in the context of the current profile. The user agent retrieves the status information for a first software feature from the global catalogue at block 333. A check is made at block 336 whether the current profile is allowed to have this software feature enforced (according to the content of the corresponding record in the authorisation list). If not, the method descends into block 339 (described in the following). Conversely, the method continues to block 342, wherein the status information for the same software feature in the context associated with the current profile is extracted from the user catalogue.

The status information from the global catalogue and the status information from the user catalogue are compared at block 348. If no action is required the method passes to block 339 directly; for example, this is the case when the software feature results in the same status in the global catalogue and in the user catalogue since the software feature has been already enforced in the context of the current profile, or when the global portion of a software product is not in a final status (such as in a back-up condition). On the contrary, the method enters block 351. The instructions needed for aligning the software feature in the context associated with the current profile to the status set out in the global catalogue are retrieved from the stored packages; the corresponding activity is then carried out under the control of the user agent. The status information for the software feature involved is accordingly updated in the user catalogue at block 354, and the method descends into block 339. Considering now block 339, the user agent verifies whether a last software feature in the global catalogue has been reached. If not, the method returns to block 333 for processing a next software feature.

Conversely, the method passes to block 357, wherein the execution of the user agent is terminated and the other operations of the logon process are completed. Operation of the client workstation is now under the control of the user, which can run all the desired applications available in the context associated with the current profile. The method then proceeds to the decisional block 360. If the client workstation has been accessed with the privileged profile and the system administrator has chosen to edit the authorisation list, the selected operations (such as insert, delete or update records) are carried out at block 366; the method then descends into block 369. Conversely, the method passes to block 369 directly.

Considering now block 369, a check is made whether the user has entered a logoff command. If not, the method returns to block 357 (for processing further requests from the user). On the contrary, if the user has closed the current session the method returns to block 327 (waiting for a new logon or the shut down of the client workstation).

Likewise considerations apply if an equivalent method is performed, for example if the logon is carried out with a different procedure, if another memory structure is provided for storing an indication of the user activities included in the package and to be executed later on under the control of the user agent, if the user activities are retrieved and executed in the context associated with the current profile in a different manner, and so on.

More generally, the present invention provides a method of distributing software features to a computer being accessible with a plurality of different user profiles each one associated with a corresponding operating context. The method includes the steps of providing a distribution package with one or more items indicative of an activity for enforcing a corresponding software feature on the computer; some of the activities are defined as user activities associated with one or more user profiles. An indication of each user activity is stored on the computer. The computer is accessed with a current user profile; each user activity associated with the current user profile is then retrieved and executed in the corresponding operating context.

The proposed solution allows specific software configurations to be deployed for the various profiles of the workstations. For example, some software products may be enabled only for certain users accessing the client workstation with selected profiles; moreover, customised configuration information (such as different operations to be executed automatically or shortcuts on a desktop) may be set for each profile. As a consequence, the method of the invention provides a very flexible solution for managing the software configurations of the client workstations in the network.

In addition, the various software features are enforced in each context only when they are actually needed. In fact, in the method described above the user activities are retrieved and executed when the client workstation is accessed with the respective profile. Therefore, if a user does not log onto the client workstation, his or her profile is never updated.

The preferred embodiment of the invention described above offers further advantages. For example, the distribution agent (running outside the context associated with the current profile) allows the global activities to be executed irrespective of the user actually working with the client workstation. The user agent running in the context associated with the current profile makes it possible to execute the respective user activities without any security concern; moreover, the user activities are carried out during the logon process, so that the corresponding software features are automatically enforced each time the user logs onto the client workstation. In an advantageous embodiment of the present invention, the distribution agent runs with the client workstation in a logoff condition. In this way, the global activities may be executed even if no user is currently logged on the client workstation at the distribution time.

Similar considerations apply if the distribution agent and the user agent perform equivalent routines, if the user agent is loaded after completion of the logon process, if the global activities and/or the user activities are not carried out automatically (for example if the user is prompted to accept the software features before they are enforced in the corresponding context), and the like. Alternatively, the user agent is kept active for the whole current session; every time a new package is received and the global activities have been executed, the distribution agent notifies the user agent accordingly, so that the corresponding software features are enforced in the context associated with the current profile immediately. However, the solution according to the present invention leads itself to be implemented even with other modules, or without the possibility of running the distribution agent when the client workstation is in the logoff condition (for example requiring the administrator to be logged on for carrying out the global activities in the privileged context).

Advantageously, the method of the invention is used for deploying software products having a global portion and a user portion necessary for activating the software product in each context. In this way, the software products installed on the client workstation may be made visible only to the desired users. In a preferred embodiment of the invention, each activity is defined as a global activity or a generic user activity (without specifying any profile). In this way, a simple flag is required in each item of the package. Moreover, the user activities are executed in each context according to a comparison between the global catalogue and the respective user catalogue; this ensures (in a simple and effective manner) that all the instructions included in the package are executed only once. The authorisation list further provides the possibility of identifying the profiles allowed to have each software feature enforced, so that the software products available to each user are configurable in a simple manner.

Likewise considerations apply if the global and user activities are defined differently, for example associating a single flag to a container including two or more items of the package, if the global catalogue and the user catalogue are replaced by equivalent memory structures, if the status information for each software feature in the global catalogue and in the user catalogue are compared in a different manner, if a simple flag is stored for indicating the completion of a generic user activity in each context (in order to avoid its repetition later on in the same context), and so on. Alternatively, the software features consist of a single portion to be installed in each desired context, each item of the package includes a field for associating the corresponding user activity with one or more profiles, the authorisation list only specifies the profiles allowed to have all the software products available (without the possibility of selecting specific software features for different profiles), the user agent is loaded only for desired profiles allowed to have the software products available, or all the software features are always enforced in every context (as soon as the client workstation is accessed with the respective profile).

In a preferred embodiment of the present invention, the method is employed in a software distribution application for a network, wherein the software features are automatically deployed from the server workstation to the client workstations. Advantageously, the method proposed by the present invention is implemented with a computer program, which is provided on CD-ROM.

Alternatively, the program is provided on floppy-disk, is pre-loaded onto the hard-disk, or is stored on any other computer readable medium, is sent to the client workstation through the network, is broadcast, or more generally is provided in any other form directly loadable into a working memory of a computer. However, the method according to the present invention leads itself to be used in any data processing system having one or more computers (even if the computers are not connected to each other in a network and the packages are copied onto CD-ROMs that are manually distributed), or to be carried out with a hardware structure installed on the client workstation (for example integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

What is claimed is:

1. A method of distributing software features to a computer being accessible with a plurality of different user profiles each one associated with a corresponding operating context, the method including the steps of:
   providing a distribution package including at least one item indicative of an activity for enforcing a corresponding software feature on the computer, at least one activity being defined as a user activity associated with at least one user profile,
   storing an indication of the at least one user activity on the computer,
   accessing the computer with a current user profile, and
   retrieving and executing each user activity associated with the current user profile in the corresponding operating context, wherein each software feature includes a global portion and a user portion necessary in each context for activating the software feature, a corresponding item being indicative of the global activity of enforcing the global portion and a further corresponding item being indicative of the user activity of enforcing the user portion of each associated user profile.

2. The method according to claim 1, wherein at least one activity is defined as a global activity associated with all the user profiles, the method further including the steps of:
   running a global agent outside the context associated with the current user profile,
   executing each global activity under the control of the global agent,
   running a user agent during a logon to the computer with the current user profile, each user activity being retrieved and executed under the control of the user agent.

3. The method according to claim 2, wherein the global agent runs on the computer in a logoff condition.

4. The method according to claim 1, wherein each item includes a flag defining the corresponding activity as a global activity or a generic user activity, the method further including, for each user activity, the steps of:
   storing an indication of a completion of the generic user activity for each user profile, and
   verifying whether the generic user activity has been completed in the context associated with the current user profile, the generic user activity being executed in the context associated with the current user profile only if the result of the verification is negative.

5. The method according to claim 4, further including the steps of:
   storing a global memory structure indicating a status of the global portion of each software feature,
   storing a user memory structure for each user profile indicating a status of the user portion of each software feature in the corresponding context, and
   verifying whether each generic user activity associated with the current user profile has been completed according to a comparison between the global memory structure and the corresponding user memory structure.

6. The method according to claim 4, further including the steps of:
   storing an indication of each user profile allowed to have each software feature enforced, and
   verifying whether the current user profile is allowed to have the software feature corresponding to each generic user activity enforced, each generic user activity being executed only if the result of the verification is positive.

7. The method according to claim 1, wherein the computer is a client workstation of a network, the method further including the step of receiving the distribution package on the client workstation from a server workstation through the network.

8. A computer program directly loadable into a working memory of a computer for performing the method of claim 1 when the program is run on the computer.

9. A program product including a computer readable medium on which the program of claim 8 is stored.

10. A software distribution application for use in a computer being accessible with a plurality of different user profiles each one associated with a corresponding operating context, the software distribution application including a distribution agent for receiving a distribution package including at least one item indicative of an activity for enforcing a corresponding software feature on the computer, at least one activity being defined as a user activity associated with at least one user profile, and for storing an indication of the at least one user activity on the computer, and a user agent for retrieving and executing each user activity associated with a current user profile in the corresponding operating context, wherein each software feature includes a global portion and a user portion necessary in each context for activating the software feature, a corresponding item being indicative of the global activity of enforcing the global portion and a further corresponding item being indicative of the user activity of enforcing the user portion of each associated user profile.

11. A system for distributing software features to a computer being accessible with a plurality of different user profiles each one associated with a corresponding operating context, the system including means for providing a distribution package including at least one item indicative of an activity for enforcing a corresponding software feature on the computer, at least one activity being defined as a user activity associated with at least one user profile, means for storing an indication of the at least one user activity on the computer, means for accessing the computer with a current user profile, and means for retrieving and executing each user activity associated with the current user profile in the corresponding operating context, wherein each software feature includes a global portion and a user portion necessary in each context for activating the software feature, a corresponding item being indicative of the global activity of enforcing the global portion and a further corresponding item being indicative of the user activity of enforcing the user portion of each associated user profile.

12. A system for distributing software features to a computer being accessible with a plurality of different user profiles each one associated with a corresponding operating context, the computer including a distribution agent for receiving a distribution package including at least one item indicative of an activity for enforcing a corresponding software feature on the computer, at least one activity being defined as a user activity associated with at least one user profile, and for storing an indication of the at least one user activity on the computer, a logon module for accessing the computer with a current user profile, and a user agent for retrieving and executing each user activity associated with the current user profile in the corresponding operating context, wherein each software feature includes a global portion and a user portion necessary in each context for activating the software feature, a corresponding item being indicative of the global activity of enforcing the global portion and a further corresponding item being indicative of the user activity of enforcing the user ortion of each associated user profile.

13. The method of claim 1, wherein the plurality of different user profiles includes a first user profile for a first user of the computer and a second user profile for a second user of the computer, and wherein the distribution package includes a first item indicative of a first user activity for enforcing a corresponding software feature on the computer for the first user profile and a second item indicative of a second user activity for enforcing a corresponding software feature on the computer for a second user profile.

14. The method of claim 13, wherein the first user activity and the second user activity are different.

15. The method of claim 13, wherein the first user activity is to enable a first software product on the computer for the first user profile, the second user activity is to enable a second software product on the computer for the second user profile, and wherein the first software product is not enabled on the computer for the second user profile.

16. The system of claim 11, wherein the plurality of different user profiles includes a first user profile for a first user of the computer and a second user profile for a second user of the computer, and wherein the distribution package includes a first item indicative of a first user activity for enforcing a corresponding software feature on the computer for the first user profile and a second item indicative of a second user activity for enforcing a corresponding software feature on the computer for a second user profile.

17. The system of claim 16, wherein the first user activity and the second user activity are different.

18. The system of claim 16, wherein the first user activity is to enable a first software product on the computer for the first user profile, the second user activity is to enable a second software product on the computer for the second user profile, and wherein the first software product is not enabled on the computer for the second user profile.

19. The computer program of claim 8, wherein the plurality of different user profiles includes a first user profile for a first user of the computer and a second user profile for a second user of the computer, and wherein the distribution package includes a first item indicative of a first user activity for enforcing a corresponding software feature on the computer for the first user profile and a second item indicative of a second user activity for enforcing a corresponding software feature on the computer for a second user profile.

20. An apparatus for distributing software features to a workstation, wherein the workstation is accessible by using one of a plurality of user profiles associated with the workstation, and wherein the user profiles have associated operating context for defining an execution environment of the workstation; comprising:

a logon module that controls access to the workstation to thereby initiate an operating context for a current user profile;

a network interface for receiving, from a provider of a software distribution package, a software distribution package that includes a list of items for enforcing a software feature on the workstation, each item having a first field which defines an activity consisting of one or more instructions to be carried out for reaching a desired software configuration, a second field that defines the activity as a global or user activity, and one or more files for enforcing the software feature;

a distribution agent that runs outside any operating context associated with user profiles of the plurality of user profiles;

a global catalogue module, controlled by the distribution agent, which specifies global portions of each software feature that have been installed on and removed from the workstation;

a user agent that performs services in the operating contexts associated with the plurality of user profiles;

a user catalogue module, controlled by the user agent, which specifies information on a status of each software feature in each of the operating contexts associated with the plurality of user profiles;

an authorization list module that includes a series of records each having a first field identifying a software feature, a second field identifying one or more user profiles allowed to have this software feature enforced, wherein:

the distribution agent, in response to receiving a software package via the network interface, executes all the actions of the software package identified as global actions and updates a status of corresponding software features in the global catalogue module;

the user agent, in response to an initiation of the operating context associated with the current user profile, retrieves status information for a software feature from the global catalogue module, determines if the current user profile is allowed to have this software feature enforce, and extracts status information from the user catalogue module for the software feature if the software feature is allowed to be enforced for the current user profile;

the user agent compares the status information from the global catalogue module to the status information from the user catalogue module and determines if any further action is necessary to enforce the software feature for the current user profile;

the user agent retrieves the instructions needed for enforcing the software feature for the current user profile if further action is determined to be necessary; and the user agent executes the retrieved instructions to thereby enforce the software feature for the current user profile and updates status information for the software feature in the user catalogue module.

* * * * *